US011356461B2

(12) United States Patent
Nainar et al.

(10) Patent No.: US 11,356,461 B2
(45) Date of Patent: Jun. 7, 2022

(54) INTEGRITY VERIFIED PATHS BETWEEN ENTITIES IN A CONTAINER-ORCHESTRATION SYSTEM

(71) Applicant: Cisco Technology, Inc., San Jose, CA (US)

(72) Inventors: Nagendra Kumar Nainar, Morrisville, NC (US); Carlos M. Pignataro, Cary, NC (US); Akram Ismail Sheriff, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 73 days.

(21) Appl. No.: 17/035,065

(22) Filed: Sep. 28, 2020

(65) Prior Publication Data

US 2022/0103570 A1    Mar. 31, 2022

(51) Int. Cl.
*H04L 9/32* (2006.01)
*H04L 9/40* (2022.01)
*H04L 45/00* (2022.01)

(52) U.S. Cl.
CPC .......... *H04L 63/126* (2013.01); *H04L 9/3213* (2013.01); *H04L 9/3265* (2013.01);
(Continued)

(58) Field of Classification Search
CPC . H04L 9/3213; H04L 9/3265; H04L 41/5009; H04L 41/5051; H04L 43/10;
(Continued)

(56) References Cited

U.S. PATENT DOCUMENTS 10,805,215 B2 * 10/2020 Nainar .................... H04L 45/74
11,228,651 B2 *  1/2022 Warnicke ............ H04L 41/5051
(Continued)

FOREIGN PATENT DOCUMENTS

CN    107947961 A    4/2018
CN    110661657 A    1/2020

OTHER PUBLICATIONS

Trani, Integrating VNF Service Chains in Kubernetes Cluster, Master Degree Thesis, Politecnico Di Torino, 86 pages, 2020.*
(Continued)

*Primary Examiner* — Frank Duong
(74) *Attorney, Agent, or Firm* — Lee & Hayes, P.C.

(57) ABSTRACT

Techniques and mechanisms for providing integrity verified paths using only integrity validated pods of nodes. A network service mesh (NSM) associated with a first pod may locally generate a nonce and provide the nonce to the first pod, where the request includes a request for an attestation token. Using the nonce, the first pod may generate the attestation token and reply back to the NSM. The NSM may generate a second request for an attestation token and forward it to a NSE pod, where the request includes a second locally generated nonce generated by the NSM. The NSE pod may generate the second attestation token using the second nonce and reply back to the NSM. The NSM may then have the attestation tokens verified or validated by a certificate authority (CA) server. The NSM may thus instantiate an integrity verified path between the first pod and the NSE pod.

20 Claims, 8 Drawing Sheets

(52) U.S. Cl.
CPC .............. *H04L 45/22* (2013.01); *H04L 45/46* (2013.01); *H04L 45/54* (2013.01)

(58) Field of Classification Search
CPC ......... H04L 45/22; H04L 45/46; H04L 45/54; H04L 63/126; H04L 67/10; H04L 67/141; H04L 67/16
See application file for complete search history.

(56) References Cited

U.S. PATENT DOCUMENTS

| | | | |
|---|---|---|---|
| 2006/0265506 A1* | 11/2006 | Merkh | H04L 69/163 709/227 |
| 2020/0084202 A1 | 3/2020 | Smith et al. | |
| 2020/0112487 A1 | 4/2020 | Inamdar et al. | |
| 2020/0186616 A1 | 6/2020 | Fitzer et al. | |

OTHER PUBLICATIONS

Dab et al., Cloud-native Service Function Chaining for 5G based on Network Service Mesh, downloadable at https://ieeexplore.ieee.org/document/9149045, 7 pages, Jul. 27, 2020.*

Network Service Mesh Webinar, downloadable at https://www.cncf.io/wp-content/uploads/2020/08/CNCF-Network-Service-Mesh-Webinar-2019-10-02.pdf, 79 pages, Nov. 18, 2019.*

Fajjari et al., Cloud Networking: An Overview of Virtual Network Embedding Strategies, IEEE, 7 pages, 2013.*

* cited by examiner

INTEGRITY VERIFIED PATHS BETWEEN ENTITIES IN A CONTAINER-ORCHESTRATION SYSTEM

TECHNICAL FIELD

The present disclosure relates generally to using locally generated random nonces and attestation tokens for establishing integrity verified paths between entities of networks.

BACKGROUND

With the evolution of cloud-native service development and the increase in the adoption rate of cloud-native and container-orchestration systems such as, for example, Kubernetes, operating a network and other service as lightweight containers is providing a large amount of benefits. Both Kubernetes and the cloud-native services are exposed to security vulnerabilities and such vulnerabilities need to be mitigated. Examples of such vulnerabilities include paths between entities of a network where an end point entity of the network is not secure, e.g., is compromised. Other entities along the path may likewise be compromised when an end point entity or other entity along a path is compromised. Additionally, other entities with which the entities along a path are in communication with become vulnerable.

Additionally, when a path between two entities is established, and verified as having integrity, the integrity of the path needs to be maintained. If the integrity of the path is compromised after establishment, then again other entities along the path as well as additional entities with which they communicate become vulnerable.

Furthermore, when a path becomes compromised, in order to provide minimal problems for the network, the compromise needs to be detected quickly and the path terminated. Thus, in order to help minimize disruption to the network, an alternate path that is integrity verified needs to be established as quickly as possible.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
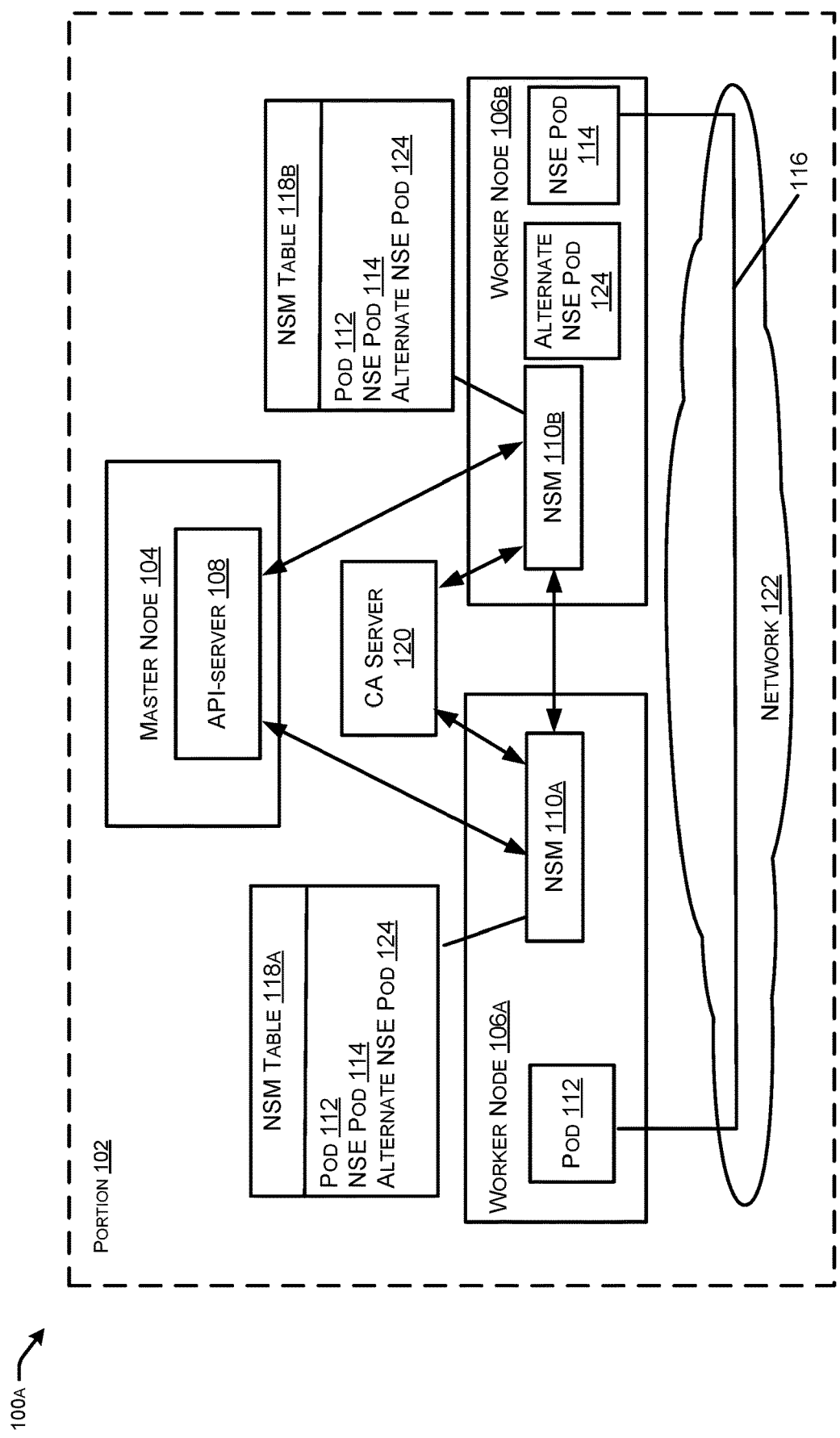
FIGS. 1A, 1B, and 1C schematically illustrate examples of a portion of a container-orchestration system configured in accordance with the Kubernetes platform.

This disclosure describes techniques for providing integrity verified paths using only integrity validated pods of nodes. For example, a first pod may request a connection, e.g., path, with a second pod that provides a particular service. Thus, the second pod may be deemed as a network service endpoint (NSE) pod. The techniques may utilize a network service mesh (NSM), which is an initiative that augments the cloud-native and container-orchestration system arrangements beyond just basic connectivity.

As an example for establishing an integrity verified path, a NSM associated with the first pod may locally generate a nonce and provide the nonce to the first pod, where the request includes a request for an attestation token. Using the nonce, the first pod may generate the attestation token and reply back to the NSM. The NSM may then have the attestation token verified by a certificate authority (CA) server, thereby confirming the integrity of the first pod. The NSM may then generate a second request for an attestation token and forward it to the second pod, e.g., the NSE pod. The request may include a second locally generated nonce generated by the NSM. The second pod may generate the second attestation token using the second nonce and provide the second attestation token to the NSM. The NSM may then have the attestation token verified by the CA server, thereby confirming the integrity of the second pod, e.g., the NSE pod. Since the attestation tokens verify the integrity of the first and second pods, the NSM may instantiate an integrity verified path between the first pod and the second pod and inject the integrity verified path into the requesting first pod.

In configurations, if the second pod, e.g., the NSE pod, is located within a different cluster or cloud, the first (local) NSM may also forward the request to a second (remote) NSM in the different cluster or cloud associated with the second pod. The second NSM may then generate an attestation token based on the nonce and provide the attestation token to the first NSM. The first NSM may then have the attestation token verified by the CA server, thereby verifying the integrity of the second NSM. If the attestation token from the second NSM is verified, then the first NSM may instantiate the integrity verified path and inject it into the first node.

Thus, in configurations, a method in accordance with techniques described herein may include receiving, by a first network service mesh (NSM) from a first pod of a first node, a first request to instantiate a first integrity verified path to a first network service endpoint (NSE) pod of a second node. The method may also include providing, by the first NSM to the first pod, a second request for a first attestation token, the second request including a first randomly generated nonce. The method may further include based at least in part on the first randomly generated nonce, generating, by the first pod, the first attestation token, receiving, by the first NSM from the first pod, the first attestation token, and verifying, by the first NSM, the first attestation token with a certificate authority (CA) server. The method may additionally include providing, by the first NSM to the first NSE pod, a third request for a second attestation token, the third request including a second randomly generated nonce and receiving, by the first NSM from the first NSE pod, the second attestation token, the second attestation token being based at least in part on the second randomly generated nonce. The method may also include verifying, by the first NSM, the second attestation token with the CA server and based at least in part on the (i) verifying the first attestation token with the CA server and (ii) verifying the second attestation token with the CA server, instantiating, by the first NSM, the first integrity verified path between the first pod and the first NSE pod.

Additionally, in configurations where the first NSM and the first node are part of a first cluster and the second node is part of a second cluster different from the first cluster, the method may further comprise providing, by the first NSM to a second NSM of the second cluster, a fourth request for a third attestation token, the fourth request including a third randomly generated nonce and receiving, by the first NSM from the second NSM, the third attestation token, the third attestation token being based at least in part on the third randomly generated nonce. The method may also include verifying, by the first NSM, the second attestation token with the CA server, wherein instantiating the first integrity verified path between the first pod and the first NSE pod is further based at least in part on the verifying the third attestation token with the CA server. In configurations, the method may additionally include receiving, by the first NSM from the second NSM, a fifth request for a fourth attestation token, the fifth request including a fourth randomly generated nonce and based at least in part on the fourth randomly generated nonce, generating, by the first NSM, the first attestation token. The method may also comprise providing, by the first NSM to the second NSM, the fourth attestation token.

Additionally, the techniques described herein may be performed by a system and/or device having non-transitory computer-readable media storing computer-executable instructions that, when executed by one or more processors, performs the method described above.

Example Embodiments

In configurations, an attestation token may allow for providing a unidirectional integrity check within a cluster of nodes, or between nodes of different clusters. Any node may query a second node, e.g., a remote node, to validate the integrity (e.g., to ensure the node is not compromised) by sending a query with a random "nonce." The second node may query the trusted platform module (TPM) to generate a new hash based on the received nonce that will be used as part of the attestation token to verify the integrity of the second node. This is included as a part of trusted execution environment (TEE) in security technology.

In configurations, a NSM associated with a cluster of nodes may query nodes and/or pods to validate the integrity (e.g., to ensure the node and/or pod is not compromised) by sending queries with random nonces. The nodes and/or pods may then generate attestation tokens based on the random nonces and provide the attestation tokens to the NSM to verify the integrity of the nodes and/or pods. The NSM may instantiate an integrity verified path between pods of the integrity verified nodes.

In configurations, a requesting pod may request an integrity verified path to a network service endpoint (NSE) pod. The request for the integrity verified path that is sent to the NSM may include various attributes. For example, the request may include attributes such as, for example, a label (e.g., conditions for selecting a NSE for providing a desired service), a network service (e.g., the type of desired service), and a color (e.g., quality of service). In configurations, the request may also include integrity attributes including integrity-verified (an indication if the node that includes the NSE pod should be integrity verified) and continuous (an indication if the node that includes the NSE pod needs to only initially be integrity verified or if the node should be periodically re-validated for integrity, e.g., the node should be continuously integrity verified). The integrity attributes may be defined by an operator during the creation of the pod configuration (or the deployment). Alternatively, the NSM may use additional policies (or labels associated with the pod) to identify if an integrity verified path is required for the requesting client (pod).

In configurations, various protocols are extended to request and send attestation tokens (such as address resolution protocol (ARP), bi-directional forwarding (BFD), control protocols, etc.). The techniques described herein leverage these protocols and let the NSM query different entities that are involved at the control plane and data plane layer for the integrity verified path instantiation. The local NSM receiving the request for an integrity verified path from the requesting pod may request the attestation token from the NSE pod. When the identified remote NSE pod is within the same cluster or cloud where the NSM is responsible (e.g., the local NSM), the attestation token request is sent directly to the NSE pod. When the identified NSE pod is external, e.g., in a remote cluster or cloud maintained by a different NSM, the attestation token request is sent to both the remote NSM and the NSE pod to obtain an attestation token from both the remote NSM and the NSE pod. Upon receiving the attestation token(s), the local NSM performs a validation of the attestation token(s) with a certificate authority (CA) server. Once the validation is a success, the NSM may instantiate the integrity verified path between the requesting pod and the NSE pod and inject the integrity verified path into the requesting pod.

Thus, in configurations, if the NSE pod is located within a different cluster or cloud, the local NSM may also forward the request to the remote NSM associated with the NSE pod. The remote NSM may then generate an attestation token based on the nonce and provide the attestation token to the local NSM. The local NSM may then have the attestation token verified by the CA server. If the attestation token from the remote NSM is verified, then the local NSM may instantiate the integrity verified path and inject it into the requesting pod.

In configurations, the NSM may contain a table of integrity verified endpoints, e.g., pods. Thus, when a request is made for an integrity verified path to a particular NSE pod, the NSM may check the table and determine if the requesting pod and/or the NSE pod are already verified, the NSM may instantiate the integrity verified path between the requesting pod and the NSE pod. In order to maintain the integrity of the various pods, the NSM interface may periodically re-validate pods within the table. The re-validation may include providing a locally generated nonce, sending it to the pod with a request for an attestation token, and then verifying the attestation token received from the pod with the CA server. A re-validation interval may define a periodic/continuous re-validation time interval. For example, in configurations, the re-validation time interval may have a periodicity in range of 50 milliseconds (ms) to 200 ms. For example, the NSM may re-validate the pods in the table every 100 ms using the validation process. A wait time may define how long a pod may have to wait if it fails the re-validation process before trying again, e.g., how long the pod has to wait before sending a request to the NSM for a different nonce value for generating an attestation token. For example, in configurations, the wait time may be in a range of 2 to 4 minutes. The re-validation interval and wait time may be defined by a user of the container-orchestration system and controlled by an operator of the container-orchestration system.

In configurations, the NSM may also generate alternate paths that utilize an alternate NSE pod for providing the requested service. Thus, if the NSM determines that a previously integrity validated path has become compromised, the NSM may immediately terminate the path and instantiate a new path utilizing the alternate NSE pod.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A schematically illustrates an example 100a of a portion 102 of a container-orchestration system configured in accordance with the Kubernetes platform. In configurations, other platforms may be used for configuring the container-orchestration system. The portion 102 includes a master node 104 and two worker nodes 106a, 106b. As is known, the portion 102 may include many more worker nodes 106. The master node 104 includes an API-server 108 and other components not illustrated for clarity. The worker nodes 106a, 106b include network service meshes (NSMs) 110a, 110b, respectively, that communicate with the API-server 108. The worker node 106a includes a pod 112, which is a grouping of one or more containers (not illustrated) that provide services. As is known, the worker node 106a may include many more pods 112. The worker node 106b includes a network service endpoint (NSE) pod 114, which is a grouping of one or more containers (not illustrated). The NSE pod 114 is generally configured to provide a specific service, e.g., a radio interface, a specific smart connection, a specific NSM endpoint that provides a firewall service, etc. Other services may be provided and the list of examples is not meant to be limiting. As is known, the worker node 106b may include many more pods similar to pod 112, as well as NSE pods 114. Likewise, the worker node 106a may include one or more NSE pods 114. As will be discussed further herein, an integrity verified path 116 connects the pod 112 and NSE pod 114. In configurations, the NSMs 110a, 110b may include a table 118a, 118b, respectively, of integrity verified pods, as will be discussed further herein.

In configurations, when a pod, e.g., pod 112, wishes to obtain a service from another pod, the pod 112 may request an integrity verified path, e.g., the integrity verified path 116, to the NSE pod, e.g., the NSE pod 114, by sending a request for an integrity verified path to the local NSM, e.g., the NSM 110a. The request for the integrity verified path 116 that is sent to the NSM 110a may include various attributes. For example, the request may include attributes such as, for example, a label (e.g., conditions for selecting a NSE for providing a desired service), a network service (e.g., the type of desired service), and a color (e.g., quality of service). In configurations, the request may also include integrity attributes including integrity-verified (an indication if the node that includes the NSE pod should be integrity verified) and continuous (an indication if the node that includes the NSE pod needs to only initially be integrity verified or if the node should be periodically re-validated for integrity, e.g., the node should be continuously integrity verified). The integrity attributes may be defined by an operator during the creation of the pod configuration (or the deployment). Alternatively, the NSM may use additional policies (or labels associated with the pod) to identify if an integrity verified path is required for the requesting client (pod).

Figure 1B:
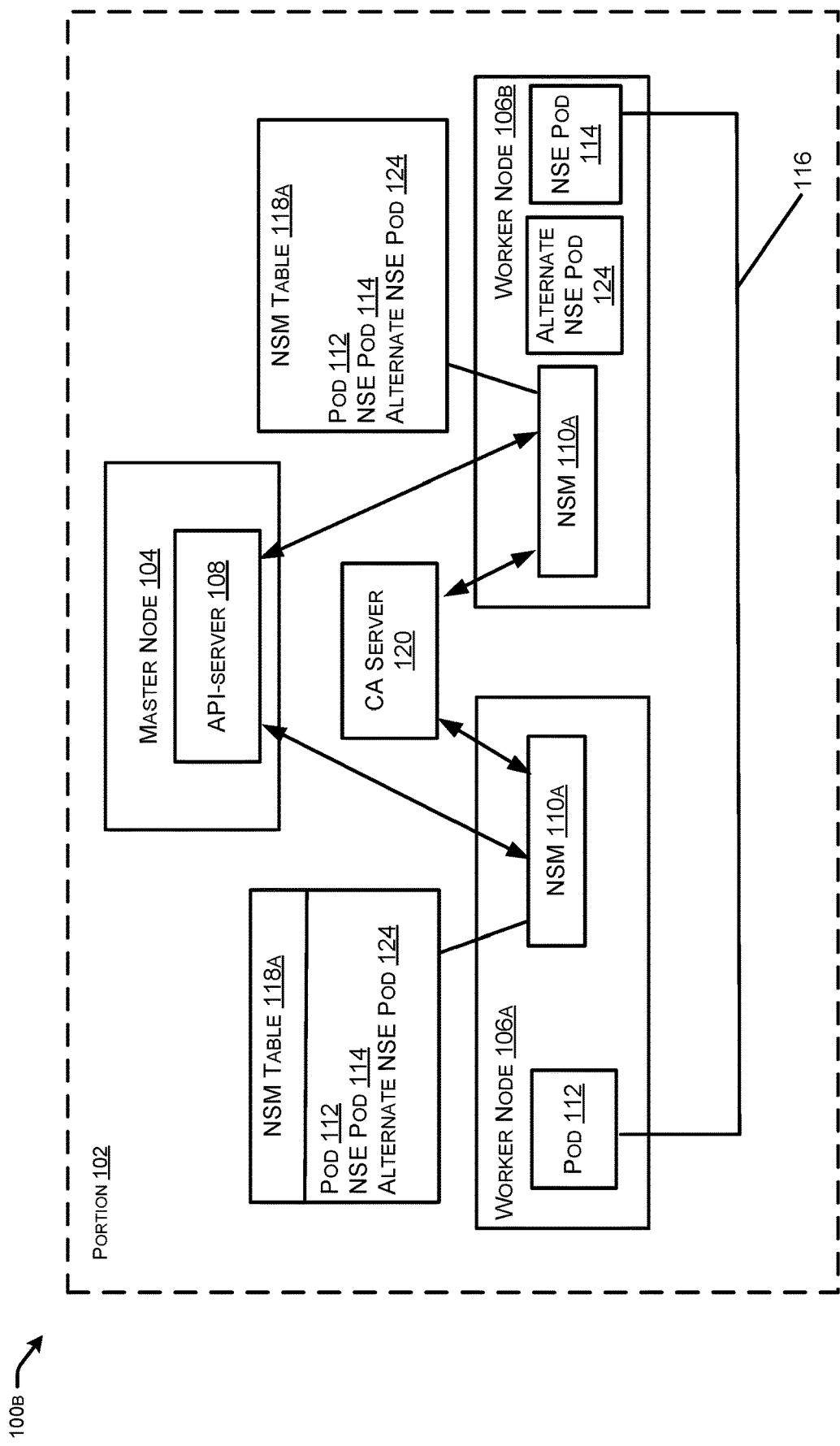

In configurations, various protocols are extended to request and send attestation tokens (such as address resolution protocol (ARP), bi-directional forwarding (BFD), control protocols, etc.). The techniques described herein leverage these protocols and let the NSM query different entities that are involved at the control plane and data plane layer for the integrity verified path instantiation. The local NSM 110a receiving the request for the integrity verified path 116 from the requesting pod 112 may request an attestation token from the pod 112. Referring to FIG. 1B, which illustrates another example 100b of the portion 102 of a container-orchestration system configured in accordance with the Kubernetes platform, when the pod 112 and the NSE pod 114 are part of the same cluster or cloud, e.g., the worker node 106a and the worker node 106b are part of the same cluster or cloud and thus, both include NSM 110a, the NSM 110a may locally generate a nonce and provide the nonce to the pod 112, where the request includes a request for an attestation token. Using the nonce, the pod 112 may generate the attestation token and reply back to the NSM 110a. The NSM 110a may then have the attestation token verified by a certificate authority (CA) server 120, thereby confirming the integrity of the pod 112. The NSM 110a may generate a second request for an attestation token and forward it to the NSE pod 114. The request may include a second locally generated nonce generated by the NSM 110a. The NSE pod 114 may generate the second attestation token using the second nonce and provide the second attestation token to the NSM 110a. The NSM 110a may have the attestation token verified by the CA server 120, thereby confirming the integrity of the NSE pod 114. Since the attestation tokens verify the integrity of the pods 112, 114, the NSM 110a may instantiate the integrity verified path 116 between the pod 112 and the NSE pod 114 and inject the integrity verified path 116 into the pod 112.

Referring back to FIG. 1A, when the NSE pod 114 is external, e.g., the worker node 106b is in a remote cluster or cloud maintained by a different remote NSM, e.g., NSM 110b, the attestation token request is sent to both the remote NSM 110b and the NSE pod 114 to obtain an attestation token from both the remote NSM 110b and the NSE pod 114. The attestation token requests may for the NSM 110b and the NSE 114 may have the same nonce or may have different nonces. Upon receiving the attestation token(s), the local NSM 110a performs a validation of the attestation token(s) with the CA server 120. Once the validation is a success, the NSM 110a may instantiate the integrity verified path 116 over network 122 between the pod 112 and the NSE pod 114 and inject the integrity verified path 116 into the pod 112.

Figure 1C:
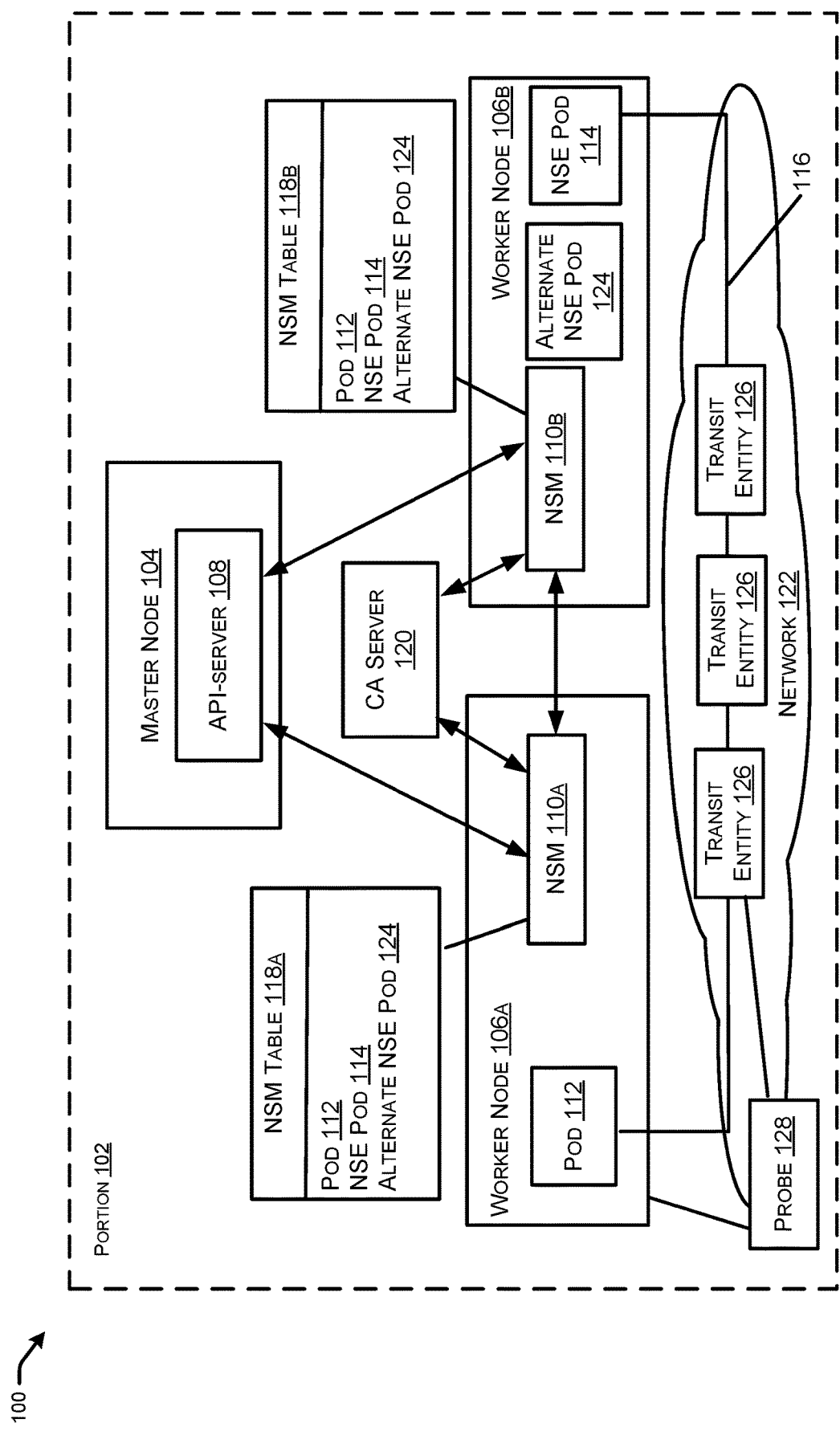

FIG. 1C schematically illustrates another example 100c of the portion 102 of a container-orchestration system configured in accordance with the Kubernetes platform. In the example 100c, the pod 112 and the NSE pod 114 are connected along integrity verified path 116 via multiple transit entities 126 of the network 122. In the example 100c, three transit entities 126 are illustrated, but in other configurations, fewer or more transit entities 126 may be included. When multiple transit entities 126 are involved in the integrity verified path 116, an in-situ (e.g., in-board) operation, administration, and maintenance (OAM) (iOAM) extension for attestation tokens may be used to query the attestation tokens from the transit entities 126 in the transit path 306 and perform the validation to ensure all the transit entities 126 in the integrity verified path 116 are integrity verified. A header of a probe 128 sent from worker node 106a to the transit entities 126 may include the iOAM extension requesting attestation tokens from the transit entities 126 to ensure the integrity. The iOAM extension may include a random nonce that may be used by the entities to generate the attestation tokens. The entities 126 may generate attestation tokens using the random nonce and forward the attestation tokens back to worker node 106a. The attestation tokens may be verified the CA server 120. The procedure using the iOAM extension may be performed from a virtual network function (vNF) or offloaded to another container within a pod of the worker node 106a or may be performed from an agent in the worker node 106a.

Figure 2A:
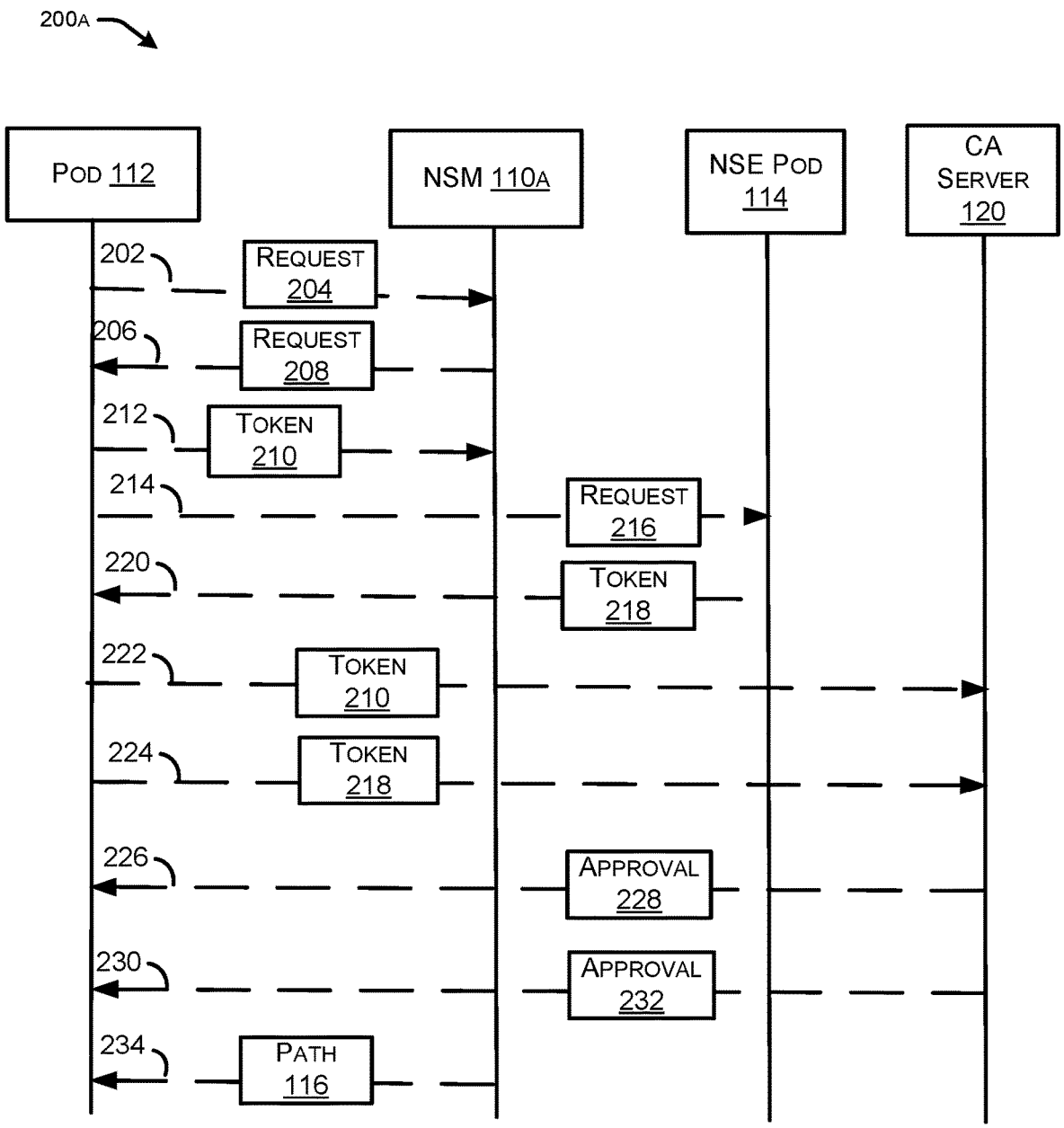
FIGS. 2A, 2B, and 2C schematically illustrate example call flows for generating an integrity verified path between a pod and a NSE pod of the container-orchestration system of FIG. 1.
Figure 2B:
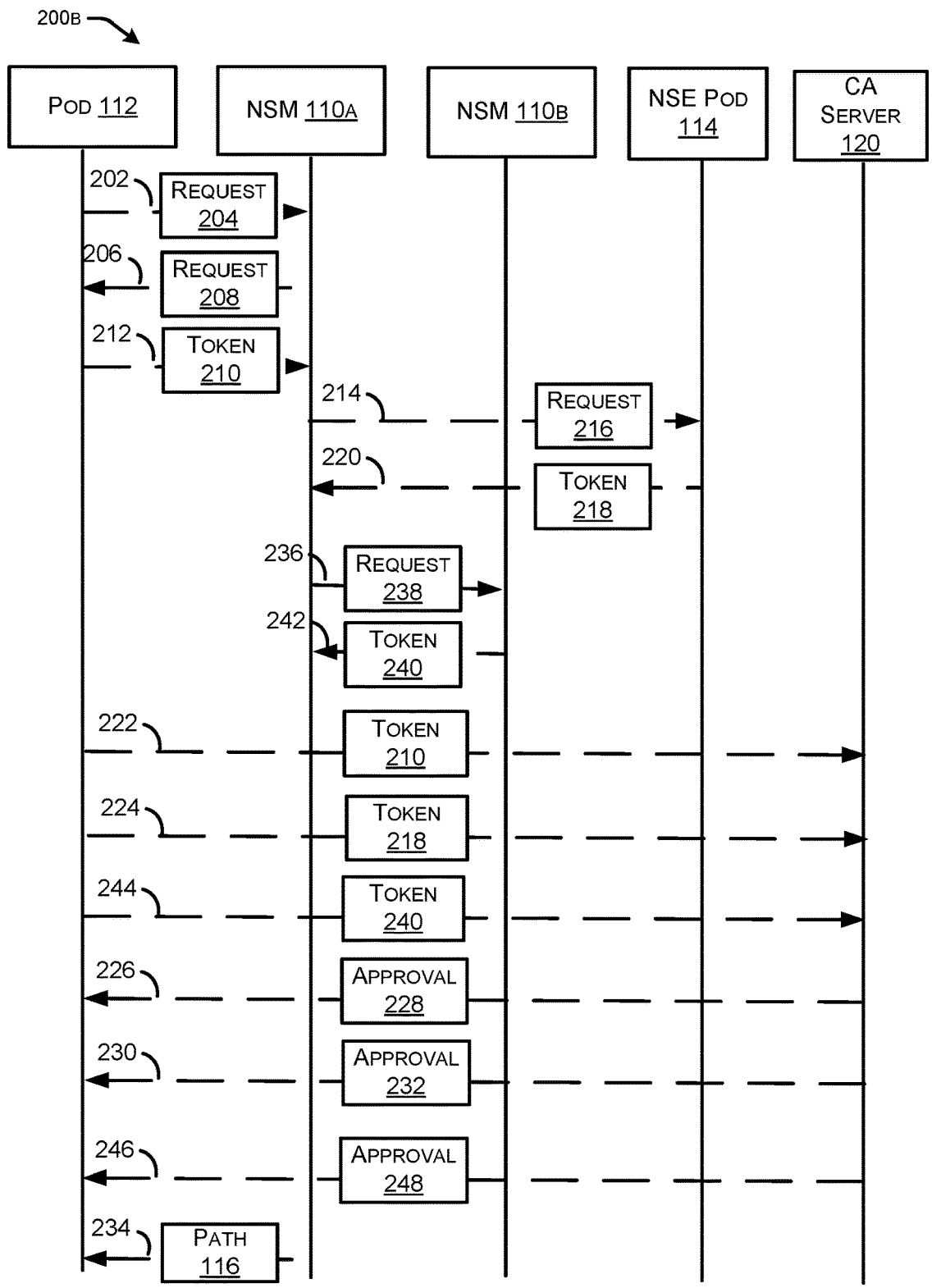
Figure 2C:
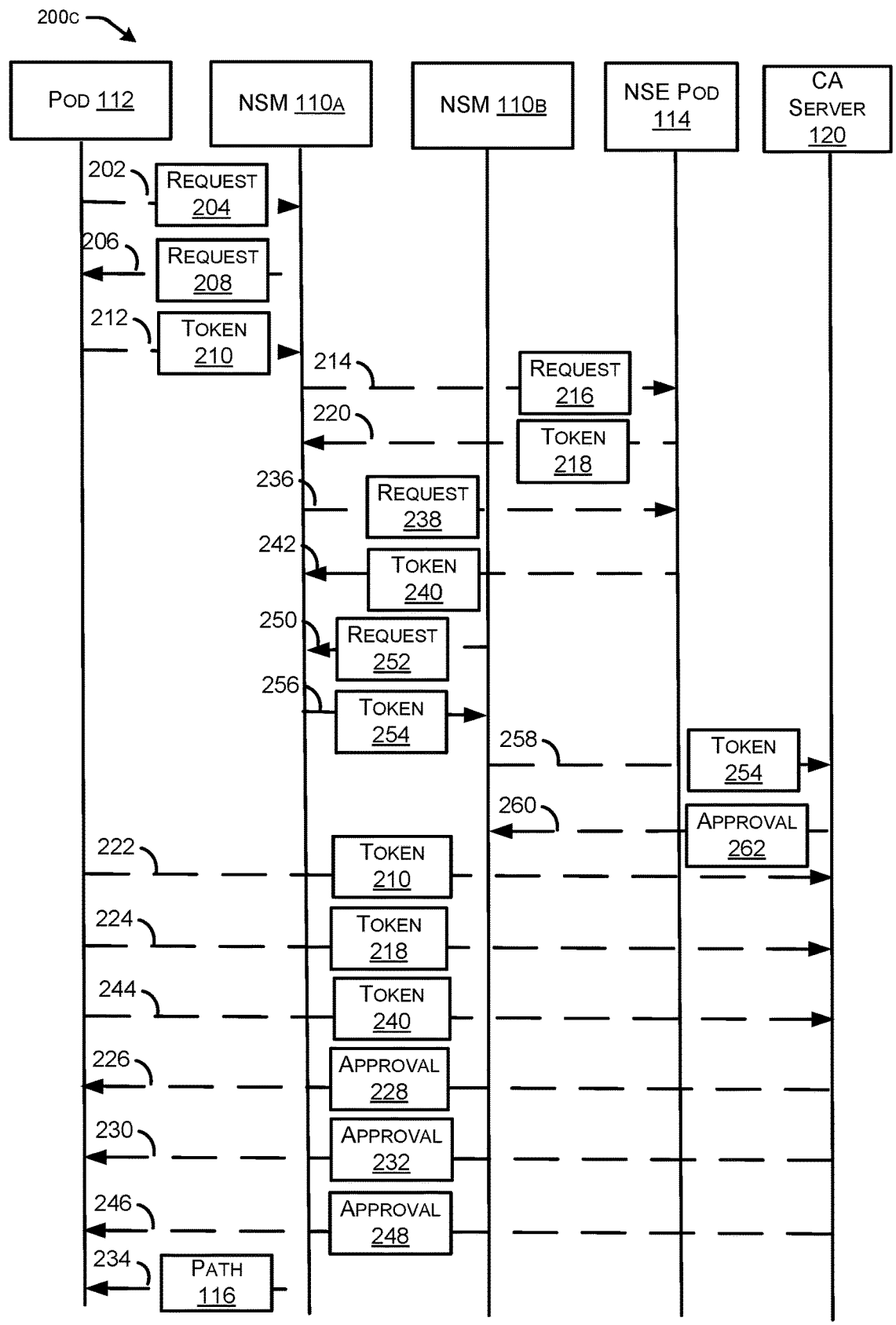

FIGS. 2A, 2B, and 2C schematically illustrate example call flows 200a, 200b, and 200c for generating an integrity verified path, e.g., integrity verified path 116. Referring to FIG. 2A, when the pod 112 and the NSE pod 114 are part of the same cluster or cloud, e.g., the worker node 106a and the worker node 106b are part of the same cluster or cloud, the pod 112 may, at 202, send a request 204 for an integrity verified path, e.g., integrity verified path 116, between pod 112 and NSE pod 114. In response, the NSM 110a generates a random nonce and, at 206, sends a request 208 for an attestation token. The token request 208 includes the randomly generated nonce. The pod 112 may then use the nonce and generate an attestation token 210. The attestation token 210 may then, at 212, be forwarded to the NSM 110a. Simultaneously, or subsequently, the NSM 110a may send, at 214, a request 216 to the NSE pod 114. The request 216 may include another locally generated random nonce. The NSE pod 114 may use the nonce to generate an attestation token 218. The NSE pod 114 may, at 220, forward the attestation token 218 to the NSM 110a.

The NSM 110a may, at 222, forward the first attestation token 210 to the CA server 120. The NSM 110a may also, at 224, forward the second attestation token 218 to the CA server 120. The CA server 120 may, at 226, forward an approval 228 with respect to the first attestation token 210 to the NSM 110a, thereby verifying the integrity of the pod 112. The CA server 120 may also, at 230, forward an approval 232 to the NSM 110a with respect to the second attestation token 218, thereby verifying the integrity of the NSE pod 114. Based upon the approvals of the attestation tokens 210 and 218, the NSM 110a may instantiate an integrity verified path, e.g., integrity verified path 116, and inject, at 234, the integrity verified path 116 into the pod 112. In configurations, the steps 222 and 224 may be combined, e.g., both attestation tokens 210, 218, may be forwarded to the CA server 120 by the NSM 110a in a single communication. Likewise, steps 226 and 230 may be combined, e.g., the approvals 228 and 232 of the attestation tokens 210, 218 may be forwarded to the NSM 110a by the CA server 120 in a single communication.

Referring to FIG. 2B, when the pod 112 and the NSE pod 114 are part of different clusters or clouds, e.g., the worker node 106a and the worker node 106b are part of different clusters or clouds, the NSM 110a may send a request for an attestation token to the NSM 110b. For the call flow 200b, the pod 112 may, at 202, send a request 204 for an integrity verified path, e.g., integrity verified path 116, between pod 112 and NSE pod 114. In response, the NSM 110a generates a random nonce and, at 206, sends a request 208 for an attestation token. The token request 208 includes the randomly generated nonce. The pod 112 may then use the nonce and generate an attestation token 210. The attestation token 210 may then, at 212, be forwarded to the NSM 110a. Simultaneously, or subsequently, the NSM 110a may send, at 214, a request 216 to the NSE pod 114. The request 216 may include another locally generated random nonce. The NSE pod 114 may use the nonce to generate an attestation token 218. The NSE pod 114 may, at 220, forward the attestation token 218 to the NSM 110a. Simultaneously, or subsequently, the NSM 110a may send, at 236, a request 238 to the NSM 110b. The request 238 may include another locally generated random nonce or may include the same nonce sent to the NSE pod 114. The NSM 110b may use the nonce to generate an attestation token 240. The NSM 110b may, at 242, forward the attestation token 240 to the NSM 110a.

The NSM 110a may, at 222, forward the first attestation token 210 to the CA server 120. The NSM 110a may also, at 224, forward the second attestation token 218 to the CA server 120. The NSM 110a may also, at 244, forward the third attestation token 240 to the CA server 120. The CA server 120 may, at 226, forward an approval 228 with respect to the first attestation token 210 to the NSM 110a, thereby verifying the integrity of the pod 112. The CA server 120 may also, at 230, forward an approval 232 to the NSM 110a with respect to the second attestation token 218, thereby verifying the integrity of the NSE pod 114. The CA server 120 may also, at 246, forward an approval 248 to the NSM 110a with respect to the third attestation token 240, thereby verifying the integrity of the NSM 110b. Based upon the approvals of the attestation tokens 210, 218, and 240, the NSM 110a may instantiate an integrity verified path, e.g., integrity verified path 116, and inject, at 234, the integrity verified path into the pod 112. In configurations, one or more of the steps 222, 224, and 244 may be combined, e.g., attestation tokens 210, 218, and 240, may be forwarded to the CA server 120 by the NSM 110a in a one or two communications. Likewise, steps 226, 230, and 246 may be combined, e.g., the approvals 228, 232, and 248 of the attestation tokens 210, 218 may be forwarded to the NSM 110a by the CA server 120 in a one or two communications.

Referring to FIG. 2C, the NSM 110b may also verify the integrity of the NSM 110a. For the call flow 200c, the pod 112 may, at 202, send a request 204 for an integrity verified path, e.g., integrity verified path 116, between pod 112 and NSE pod 114. In response, the NSM 110a generates a random nonce and, at 206, sends a request 208 for an attestation token. The token request 208 includes the randomly generated nonce. The pod 112 may then use the nonce and generate an attestation token 210. The attestation token 210 may then, at 212, be forwarded to the NSM 110a. Simultaneously, or subsequently, the NSM 110a may send, at 214, a request 216 to the NSE pod 114. The request 216 may include another locally generated random nonce. The NSE pod 114 may use the nonce to generate an attestation token 218. The NSE pod 114 may, at 220, forward the attestation token 218 to the NSM 110a. Simultaneously, or subsequently, the NSM 110a may send, at 236, a request 238 to the NSE pod 114. The request 238 may include another locally generated random nonce or may include the same nonce sent to the NSE pod 114. The NSM 110b may use the nonce to generate an attestation token 240. The NSM 110b may, at 242, forward the attestation token 240 to the NSM 110a. Simultaneously, or subsequently, the NSM 110b may send, at 250, a request 252 to the NSM 110a. The request 252 may include a locally generated random nonce generated by the NSM 110b. The NSM 110a may use the nonce to generate a fourth attestation token 254. The NSM 110a may, at 256, forward the attestation token 254 to the NSM 110b.

The NSM 110a may, at 222, forward the first attestation token 210 to the CA server 120. The NSM 110a may also, at 224, forward the second attestation token 218 to the CA server 120. The NSM 110a may also, at 244, forward the third attestation token 240 to the CA server 120. The NSM 110b may also, at 258, forward the fourth attestation token 254 to the CA server 120. The CA server 120 may, at 226, forward an approval 228 with respect to the first attestation token 210 to the NSM 110a, thereby verifying the integrity of the pod 112. The CA server 120 may also, at 230, forward an approval 232 to the NSM 110a with respect to the second attestation token 218, thereby verifying the integrity of the NSE pod 114. The CA server 120 may also, at 246, forward an approval 248 to the NSM 110a with respect to the third attestation token 240, thereby verifying the integrity of the NSM 110b. The CA server 120 may also, at 260, forward an approval 262 to the NSM 110b with respect to the fourth attestation token 254, thereby verifying the integrity of the NSM 110a. In configurations, the NSM 110b may wait to generate the attestation token 240 until the CA server 120 verifies the integrity of the NSM 110a. Also, if the integrities of any of pod 112, NSE pod 114, NSM 110a, and/or NSM 110b, the API server 108 or some other entity may be notified.

Based at least in part upon the approvals of the attestation tokens 210, 218, and 240, the NSM 110a may instantiate an integrity verified path, e.g., integrity verified path 116, and inject, at 234, the integrity verified path into the pod 112. As previously noted, in configurations, one or more of the steps 222, 224, and 244 may be combined, e.g., attestation tokens 210, 218, and 240, may be forwarded to the CA server 120 by the NSM 110a in a one or two communications. Likewise, steps 226, 230, and 246 may be combined, e.g., the approvals 228, 232, and 248 of the attestation tokens 210, 218 may be forwarded to the NSM 110a by the CA server 120 in a one or two communications.

As previously noted, with respect to FIG. 1A, in configurations, the NSMs 110a, 110b may maintain a table 118a, 118b, respectively, of integrity verified endpoints, e.g., pod 112 and NSE pod 114 after being verified or validated as previously described. Thus, when a request is made for an integrity verified path to a particular NSE pod, e.g., NSE pod 114, the NSM, e.g., the NSM 110a may check the table 118a and determine if the requesting pod, e.g., pod 112 and/or the NSE pod, e.g., NSE pod 114, are already verified, the NSM 110a may instantiate the integrity verified path 116 between the requesting pod 112 and the NSE pod 114.

In order to maintain the integrity of the various pods in the tables 118a, 118b, the NSMs 110a, 110b may respectively periodically re-validate pods stored in the tables 118a, 118b. The re-validation may include providing a locally generated random nonce, sending it to a pod e.g., pod 112, with a request for an attestation token, and then verifying the attestation token received from the pod with the CA server 120. A re-validation interval may define a periodic/continuous re-validation time interval. For example, in configurations, the re-validation time interval may have a periodicity in range of 50 milliseconds (ms) to 200 ms. For example, the NSM 110a may re-validate the pods in the table every 100 ms using the validation process. A wait time may define how long a pod may have to wait if it fails the re-validation process before trying again, e.g., how long the pod has to wait before sending a request to the NSM for a different nonce value for generating an attestation token. For example, in configurations, the wait time may be in a range of 2 to 4 minutes. The re-validation interval and wait time may be defined by a user of the container-orchestration system and controlled by an operator of the container-orchestration system.

Referring back to FIG. 1A, in configurations, the NSMs may also generate alternate paths (not illustrated) that utilize an alternate NSE pod 124 for providing the requested service. Thus, if one or more of the NSMs determine a previously integrity validated path, e.g., integrity verified path 116, has become compromised, the NSM, e.g., NSM 110a, may immediately terminate the integrity verified path 116 and instantiate a new integrity verified path utilizing the alternate NSE pod 124. The alternate NSE pod 124 may be validated at the same time the NSE pod 114 is validated (e.g., in response to the node 112 requesting the integrity verified path 116) or upon termination of the integrity verified path 116. The alternate NSE pod 124 may be validated by the NSM 110a by generating a request for an attestation token and forwarding the request to the alternate NSE pod 124. The request may include a locally generated nonce generated by the NSM 110a. The alternate NSE pod 124 may generate the attestation token using the nonce and provide the attestation token to the NSM 110a. The NSM 110a may have the attestation token verified by the CA server 120, thereby confirming the integrity of the alternate NSE pod 124. The alternate NSE pod may be part of worker node 106a, worker node 106b, or a different worker node (not illustrated). Once verified, the alternate NSE pod 124 may be stored in the tables 118a, 118b. Thus, the alternate NSE pod 124 may also be verified by the NSM 110a based on its inclusion in the table 118a.

Figure 3:
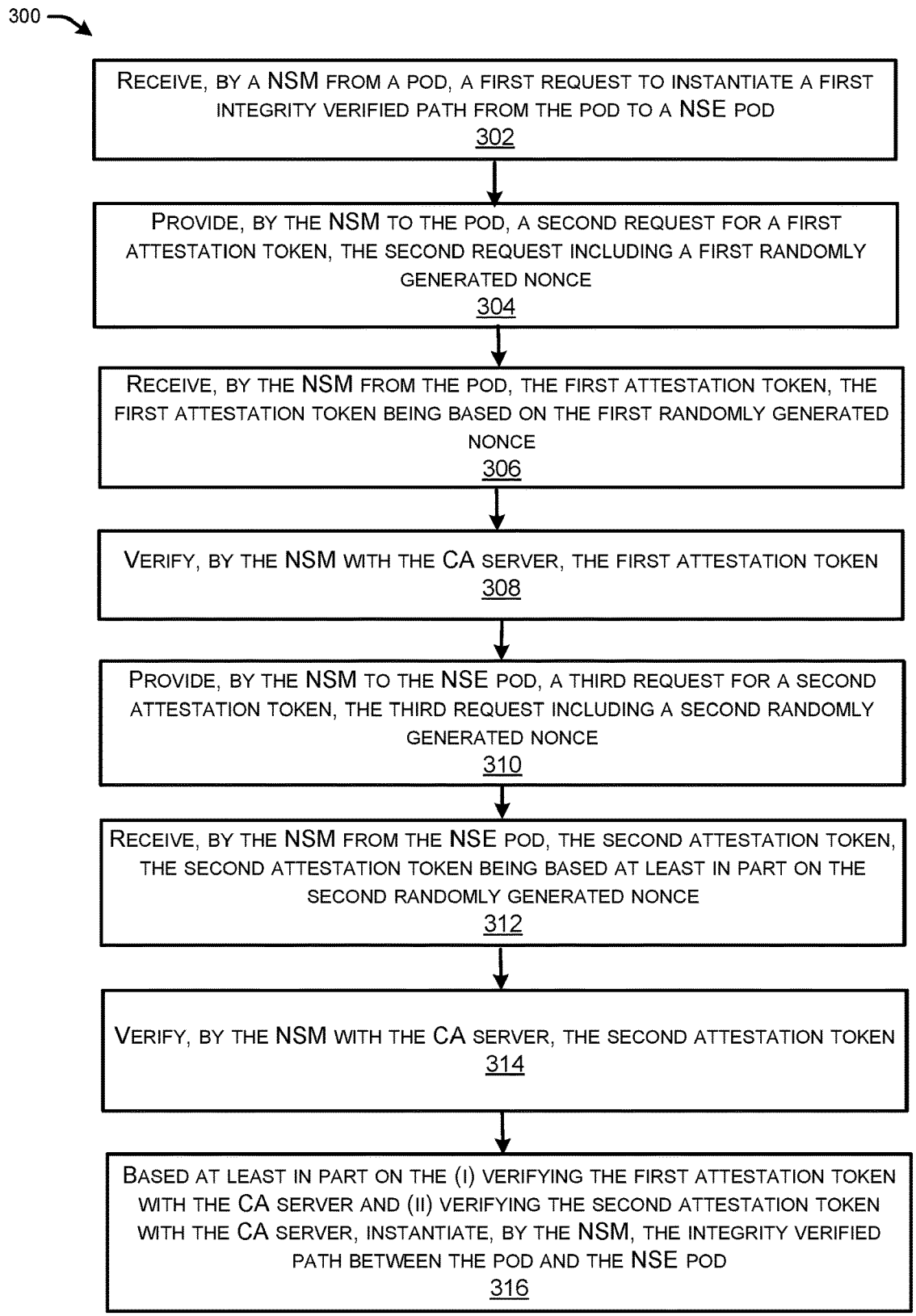
FIG. 3 illustrates a flow diagram of an example method for instantiating an integrity verified path between a pod of a first node and a NSE node.

FIG. 3 illustrates a flow diagram of example method 400, that illustrate aspects of the functions performed at least partly by the NSM 110a as described in FIGS. 1A, 1B, 1C, 2A, 2B, and 2C. The logical operations described herein with respect to FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for instantiating an integrity verified path, e.g., integrity verified path 116, between a pod, e.g., pod 112, and a NSE node, e.g., NSE node 114. In some examples, the techniques of method 300 may be performed by a NSM, e.g., NSM 110a. In such examples, the NSM may comprise one or more hardware interfaces configured to send and receive packets of data in the network, one or more processors, and one or more non-transitory computer-readable media storing computer-executable instructions that, when executed by the one or more processors, cause the one or more processors to perform steps of method 300.

At 302, a first request to instantiate a first integrity verified path from a pod to a NSE pod is received by a NSM from the pod. For example, the pod 112 may send a request to NSM 110a for an integrity verified path 116 from pod 112 to NSE pod 114.

At 304, a second request for a first attestation token is provided by the NSM to the pod, the second request including a first randomly generated nonce. For example, the NSM 110a may provide a request 204 to the pod 112 for an attestation token 208.

At 306, the first attestation token is received by the NSM from the pod, the first attestation token being based on the first randomly generated nonce. For example, the pod 112 may use the first randomly generated nonce and generate the attestation token 208. The pod 112 may then send the attestation token 208 to the NSM 110a.

At 308, the first attestation token is verified by the NSM with a certificate authority (CA) server. For example, the NSM 110a may send the attestation token 208 to the CA server 120. The CA server 120 may verify the attestation token 208 and send an approval 228 to the NSM 110a.

At 310, a third request for a second attestation token is provided by the NSM to the NSE pod, the third request including a second randomly generated nonce. For example, the NSM 110a may provide a request 216 to the NSE pod 114 for an attestation token 220.

At 312, the second attestation token is received by the NSM from the NSE pod. For example, the NSE pod 114 may send the attestation token 220 to the NSM 110a.

At 314, the second attestation token is verified by the NSM with a certificate authority (CA) server. For example, the NSM 110a may send the attestation token 220 to the CA server 120. The CA server 120 may verify the attestation token 220 and send an approval 232 to the NSM 110a.

At 316, based at least in part on the (i) verifying the first attestation token with the CA server and (ii) verifying the second attestation token with the CA server, instantiating, by the NSM, the integrity verified path between the pod and the NSE pod. For example, once the NSM 110a has received the approvals 228 and 232 from the CA server 120 verifying the integrity of the pod 112 and the NSE pod 114, the NSM 110a may instantiate the integrity verified path 116 and inject the integrity verified path 116 into the pod 112.

Figure 4:
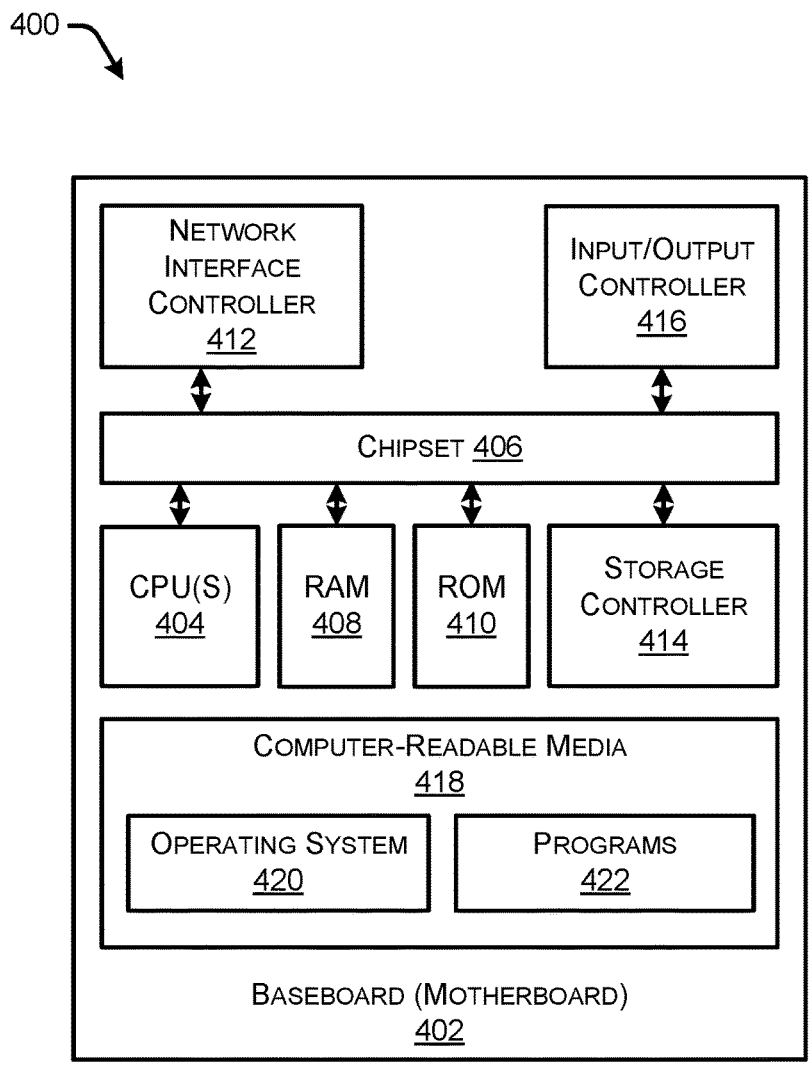
FIG. 4 is a computer architecture diagram showing an illustrative computer hardware architecture for implementing a state change monitoring service and a data gathering and/or analytics service that can be utilized to implement aspects of the various technologies presented herein.

FIG. 4 shows an example computer architecture for a computer 400 capable of executing program components for implementing the functionality described above. One or more computers 400 shown in FIG. 4 may be used to implement one or more elements of the example 100 of the portion 102 of the container-orchestration system described herein, and may comprise a conventional server computer, workstation, desktop computer, laptop, tablet, network appliance, e-reader, smartphone, or other computing device, and can be utilized to execute any of the software components presented herein. In some examples, however, the computer 400 may correspond to networked devices such as servers, switches, routers, hubs, bridges, gateways, modems, repeaters, access points, etc., and can be utilized to execute any of the software components presented herein.

The computer 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400. The chipset 406 can further provide an interface to a computer-readable storage medium such as a read-only memory ("ROM") 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical connections to remote computing devices and computer systems through a network, such as the network 102. The chipset 406 can include functionality for providing network connectivity through a NIC 412, such as a gigabit Ethernet adapter. The NIC 412 is capable of connecting the computer 400 to other computing devices over the portion 102. It should be appreciated that multiple NICs 412 can be present in the computer 400, connecting the computer to other types of networks and remote computer systems.

The computer 400 can be connected to a storage device 418 that provides non-volatile storage for the computer. The storage device 418 can store an operating system 420, programs 422, and data, which have been described in greater detail herein. The storage device 418 can be connected to the computer 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computer 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device 418 by detecting the physical states or characteristics of one or more particular locations within the physical storage units.

In addition to the mass storage device 418 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400. In some examples, the operations performed by the portion 102 of the container-orchestration system, and or any components included therein, may be supported by one or more devices similar to computer 400. Stated otherwise, some or all of the operations performed by the portion 102, and or any components included therein, may be performed by one or more computer devices 402 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 418 can store other system or application programs and data utilized by the computer 400.

In one embodiment, the storage device 418 or other computer-readable storage media is encoded with computer-executable instructions which, when loaded into the computer 400, transform the computer from a general-purpose computing system into a special-purpose computer capable of implementing the embodiments described herein. These computer-executable instructions transform the computer 400 by specifying how the CPUs 404 transition between states, as described above. According to one embodiment, the computer 400 has access to computer-readable storage media storing computer-executable instructions which, when executed by the computer 400, perform the various processes described above with regard to FIGS. 1A, 1B, 1C, 2A, 2B, and 2C. The computer 400 can also include computer-readable storage media having instructions stored thereupon for performing any of the other computer-implemented operations described herein.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computer 400 might not include all of the components shown in FIG. 4, can include other components that are not explicitly shown in FIG. 4, or might utilize an architecture completely different than that shown in FIG. 4.

The programs 422 may comprise any type of programs or processes to perform the techniques described in this disclosure for verifying the integrity of the pods, NSMs, and transit entities 308, e.g., pod 112, NSE pod 114, alternate pod 124, NSM 110a, NSM 110b, and transit entities 308 of the portion of 102 of the container-orchestration system configured in accordance with the Kubernetes platform. Generally, the programs 422 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
receiving, by a first network service mesh (NSM) from a first pod of a first node, a first request to instantiate a first integrity verified path to a first network service endpoint (NSE) pod of a second node;
providing, by the first NSM to the first pod, a second request for a first attestation token, the second request including a first randomly generated nonce;
receiving, by the first NSM from the first pod, the first attestation token, the first attestation token being based at least in part on the first randomly generated nonce;
verifying, by the first NSM, the first attestation token with a certificate authority (CA) server;
providing, by the first NSM to the first NSE pod, a third request for a second attestation token, the third request including a second randomly generated nonce;
receiving, by the first NSM from the first NSE pod, the second attestation token, the second attestation token being based at least in part on the second randomly generated nonce;
verifying, by the first NSM, the second attestation token with the CA server; and based at least in part on the (i) verifying the first attestation token with the CA server and (ii) verifying the second attestation token with the CA server, instantiating, by the first NSM, the first integrity verified path between the first pod and the first NSE pod.

2. The computer-implemented method of claim 1, wherein the first NSM, the first node, and the second node are part of a same cluster.

3. The computer-implemented method of claim 1, wherein the first NSM and the first node are part of a first cluster and the second node is part of a second cluster different from the first cluster, the method further comprising:
   providing, by the first NSM to a second NSM of the second cluster, a fourth request for a third attestation token, the fourth request including a third randomly generated nonce;
   receiving, by the first NSM from the second NSM, the third attestation token, the third attestation token being based at least in part on the third randomly generated nonce; and
   verifying, by the first NSM, the second attestation token with the CA server,
   wherein instantiating the first integrity verified path between the first pod and the first NSE pod is further based at least in part on the verifying the third attestation token with the CA server.

4. The computer-implemented method of claim 3, further comprising:
   receiving, by the first NSM from the second NSM, a fifth request for a fourth attestation token, the fifth request including a fourth randomly generated nonce;
   based at least in part on the fourth randomly generated nonce, generating, by the first NSM, the first attestation token; and
   providing, by the first NSM to the second NSM, the fourth attestation token.

5. The computer-implemented method of claim 1, further comprising:
   maintaining, by the first NSM, a table storing integrity verified pods.

6. The computer-implemented method of claim 5, further comprising:
   receiving, by the first NSM from a third pod of the first node, a fourth request to instantiate a second integrity verified path to a second NSE pod of a third node;
   based at least in part on the table, determining, by the first NSM, that the third pod and the second NSE pod are integrity verified; and
   based at least in part on the determining that the third pod and the second NSE pod are integrity verified, instantiating, by the first NSM, the second integrity verified path between the third pod and the second NSE pod.

7. The computer-implemented method of claim 5, further comprising:
   periodically re-validating, by the first NSM, integrity of the integrity verified pods, wherein the periodically re-validating the integrity of an integrity verified pod of the integrity verified pods comprises:
      providing, by the first NSM to the integrity verified pod, a fourth request for a third attestation token, the fourth request including a third randomly generated nonce;
      receiving, by the first NSM from the integrity verified pod, the third attestation token, the third attestation token being based at least in part on the third randomly generated nonce; and
      verifying, by the first NSM, the third attestation token with the CA server.

8. The computer-implemented method of claim 1, further comprising:
   determining, by the first NSM, an alternate NSE pod for the first NSE pod; and
   validating, by the first NSM, integrity of the alternate NSE pod, wherein validating integrity of the alternate NSE pod comprises:
      providing, by the first NSM to the alternate NSE pod, a fourth request for a third attestation token, the fourth request including a third randomly generated nonce;
      receiving, by the first NSM from the alternate NSE pod, the third attestation token, the third attestation token being based at least in part on the third randomly generated nonce; and
      verifying, by the first NSM, the third attestation token with the CA server.

9. The computer-implemented method of claim 8, further comprising:
   determining, by the first NSM, that the first integrity verified path is compromised;
   based at least in part on the determining that the first integrity verified path is compromised, terminating, by the first NSM, the first integrity verified path; and
   instantiating, by the first NSM, a second integrity verified path between the first pod and the alternate NSE pod.

10. One or more non-transitory computer-readable media storing computer-executable instructions that, when executed by one or more processors, cause the one or more processors to perform actions comprising:
    receiving, from a first pod of a first node, a first request to instantiate a first integrity verified path to a first network service endpoint (NSE) pod of a second node;
    providing, to the first pod, a second request for a first attestation token, the second request including a first randomly generated nonce;
    receiving, from the first pod, the first attestation token, the first attestation token being based at least in part on the first randomly generated nonce;
    verifying the first attestation token with a certificate authority (CA) server;
    providing, to the first NSE pod, a third request for a second attestation token, the third request including a second randomly generated nonce;
    receiving, from the first NSE pod, the second attestation token, the second attestation token being based at least in part on the second randomly generated nonce;
    verifying the second attestation token with the CA server; and
    based at least in part on the (i) verifying the first attestation token with the CA server and (ii) verifying the second attestation token with the CA server, instantiating the first integrity verified path between the first pod and the first NSE pod.

11. The one or more non-transitory computer-readable media of claim 10, wherein the first node and the second node are part of a same cluster.

12. The one or more non-transitory computer-readable media of claim 10, wherein the first node is part of a first cluster and the second node is part of a second cluster different from the first cluster, the actions further comprising:
    providing, a NSM of the second cluster, a fourth request for a third attestation token, the fourth request including a third randomly generated nonce;

receiving, from the NSM, the third attestation token, the third attestation token being based at least in part on the third randomly generated nonce; and verifying the second attestation token with the CA server, wherein instantiating the first integrity verified path between the first pod and the first NSE pod is further based at least in part on the verifying the third attestation token with the CA server.

13. The one or more non-transitory computer-readable media of claim 12, wherein the actions further comprise:

receiving, from the NSM, a fifth request for a fourth attestation token, the fifth request including a fourth randomly generated nonce;

based at least in part on the fourth randomly generated nonce, generating the first attestation token; and providing, to the NSM, the fourth attestation token.

14. The one or more non-transitory computer-readable media of claim 10, wherein the actions further comprise:

maintaining a table storing integrity verified pods.

15. The one or more non-transitory computer-readable media of claim 14, wherein the actions further comprise:

receiving, from a third pod of the first node, a fourth request to instantiate a second integrity verified path to a second NSE pod of a third node;

based at least in part on the table, determining that the third pod and the second NSE pod are integrity verified; and based at least in part on the determining that the third pod and the second NSE pod are integrity verified, instantiating the second integrity verified path between the third pod and the second NSE pod.

16. The one or more non-transitory computer-readable media of claim 14, wherein the actions further comprise:

periodically re-validating integrity of the integrity verified pods, wherein the periodically re-validating the integrity of an integrity verified pod of the integrity verified pods comprises:

providing, to the integrity verified pod, a fourth request for a third attestation token, the fourth request including a third randomly generated nonce;

receiving, from the integrity verified pod, the third attestation token, the third attestation token being based at least in part on the third randomly generated nonce; and verifying the third attestation token with the CA server.

17. The one or more non-transitory computer-readable media of claim 10, wherein the actions further comprise:

determining an alternate NSE pod for the first NSE pod; and validating integrity of the alternate NSE pod, wherein validating integrity of the alternate NSE pod comprises:

providing, to the alternate NSE pod, a fourth request for a third attestation token, the fourth request including a third randomly generated nonce;

receiving, from the alternate NSE pod, the third attestation token, the third attestation token being based at least in part on the third randomly generated nonce; and verifying the third attestation token with the CA server.

18. The one or more non-transitory computer-readable media of claim 17, wherein the actions further comprise:

determining that the first integrity verified path is compromised;

based at least in part on the determining that the first integrity verified path is compromised, terminating the first integrity verified path; and instantiating a second integrity verified path between the first pod and the alternate NSE pod.

19. A computer-implemented method comprising:

receiving, by a network service mesh (NSM) from a pod of a first node, a first request to instantiate an integrity verified path to a network service endpoint (NSE) pod of a second node;

receiving, by the NSM from the pod, a first attestation token, the first attestation token being based at least in part on a first randomly generated nonce;

verifying, by the NSM, the first attestation token with a certificate authority (CA) server;

receiving, by the NSM from the NSE pod, a second attestation token, the second attestation token being based at least in part on a second randomly generated nonce;

verifying, by the NSM, the second attestation token with the CA server; and based at least in part on the (i) verifying the first attestation token with the CA server and (ii) verifying the second attestation token with the CA server, instantiating, by the NSM, the integrity verified path between the pod and the NSE pod.

20. The computer-implemented method of claim 19, wherein the NSM is a first NSM that is part of a first cluster that includes the first node and the second node is part of a second cluster different from the first cluster, the method further comprising:

receiving, by the first NSM from a second NSM, a third attestation token, the third attestation token being based at least in part on a third randomly generated nonce; and verifying, by the first NSM, the second attestation token with the CA server, wherein instantiating the integrity verified path between the pod and the NSE pod is further based at least in part on the verifying the third attestation token with the CA server.

* * * * *